Figure 1:
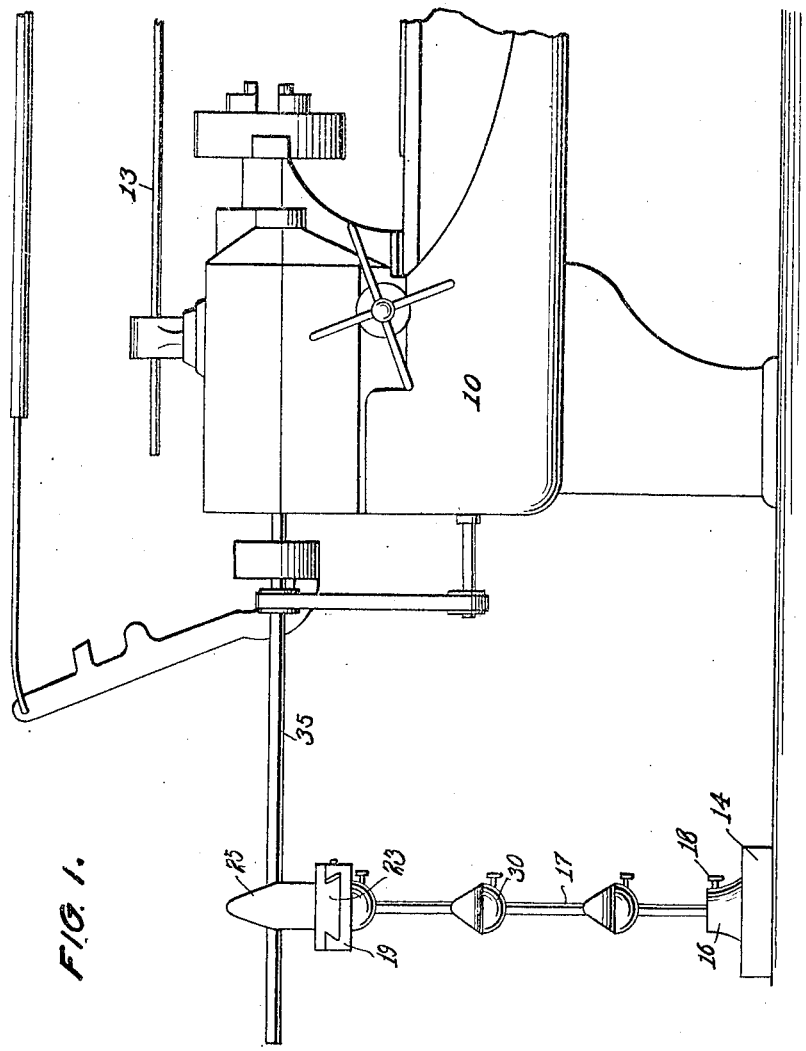

L. F. GUNTHER.
REST BAR FOR LATHES.
APPLICATION FILED JAN. 16, 1918.

1,292,456.

Patented Jan. 28, 1919.
2 SHEETS—SHEET 1.

WITNESSES
W. C. Fielding.
W™ Seaman

INVENTOR
Leon F. Gunther
BY Richard Owen.
ATTORNEY

L. F. GUNTHER.
REST BAR FOR LATHES.
APPLICATION FILED JAN. 16, 1918.
1,292,456.
Patented Jan. 28, 1919.
2 SHEETS—SHEET 2.
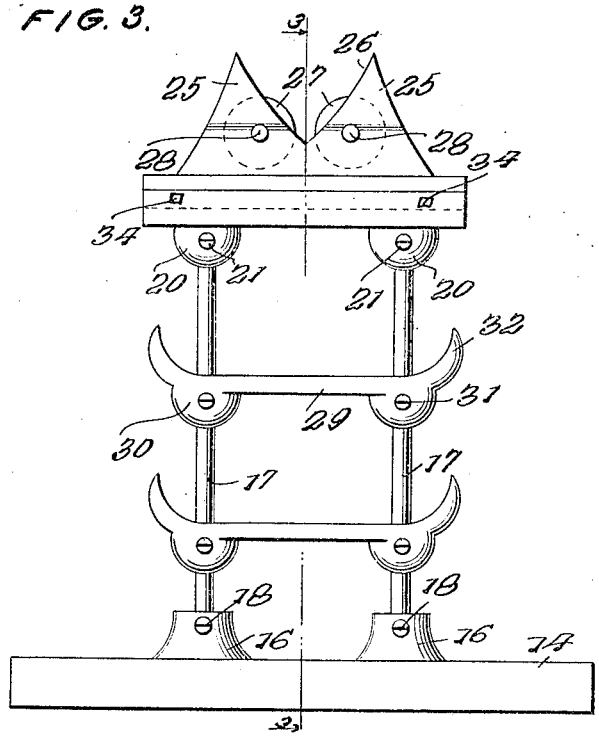
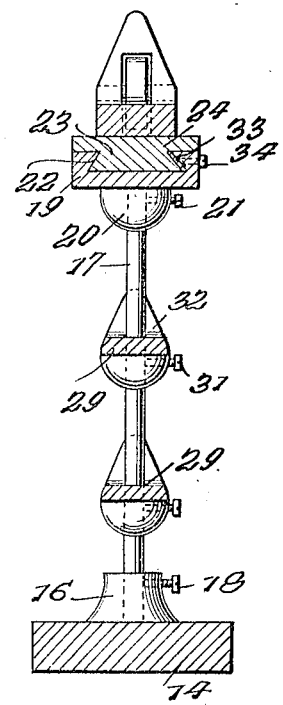
WITNESSES
INVENTOR
Leon F. Gunther
ATTORNEY

UNITED STATES PATENT OFFICE.

LEON F. GUNTHER, OF PIQUA, OHIO.

REST-BAR FOR LATHES.

1,292,456. Specification of Letters Patent. Patented Jan. 28, 1919.

Application filed January 16, 1918. Serial No. 212,094.

*To all whom it may concern:*

Be it known that I, LEON F. GUNTHER, a citizen of the United States, residing at Piqua, in the county of Miami and State of Ohio, have invented certain new and useful Improvements in Rest-Bars for Lathes, of which the following is a specification.

This invention has relation to improvements in turret lathes, and has for an object to provide an improved bar rest for supporting the bar used in bar and chuck work.

Another object of the invention is to provide an improved bar rest for turret lathes embodying a bar support mounted for sliding movement transversely of the lathe whereby a bar of any desired length may be supported thereupon and adjusted transversely.

Another object of the invention is to provide an improved bar rest of the character above set forth embodying a pair of transversely spaced supports upon the upper ends of which the slide for the bar is mounted, said support also supporting vertically adjustable members having hooked terminals forming a support for various articles, the slide to support the bar embodying spaced pulleys between which the bars are rotatably supported.

In addition to the foregoing my invention comprehends improvements in the details of construction and arrangement of the parts to be hereinafter more fully described and particularly set forth in the appended claims.

In the accompanying drawings in which similar and corresponding parts are designated by the same characters of reference throughout the several views in which they appear:

Figure 1 is a side elevation of the head stock of a lathe and of my invention adjacent; Fig. 2 is a vertical section of the bar rest enlarged; and Fig. 3 is a side elevation of the same.

Mounted at the left hand end of the lathe is my improved bar rest including a bottom plate 14 held in clamped position upon the floor adjacent the lathe through the medium of any suitable means. Projecting upwardly from the plate 14 are a pair of bosses 16 apertured centrally to receive the lower ends of uprights 17 which may be rods circular in cross section. Set screws 18 penetrate the sides of the bosses 16 to engage the supports to securely hold the supports in place. Mounted upon the upper ends of the uprights 17 and connecting the same is a guide 19 having apertured enlargements 20 formed upon its under side to receive the upper ends of said uprights 17, set screws 21 penetrating the enlargements to engage the uprights.

The guide 19 is formed upon its upper surface with a transversely extending dovetailed groove 22 designed to receive a dovetail extension 23 of a slide 24. Formed with the slide are a pair of upwardly projecting V-shaped members 25 defining a V-shaped recess therebetween as indicated at 26. Each upwardly projecting member 25 is slotted to receive a roller 27 therein, the rollers 27 being in spaced relation and provided with journals 28 which enter openings in said upstanding member 25 to permit the rollers to readily rotate.

The uprights 17 also serve to support members in the form of connecting bars 29, enlarged at each end as indicated at 30 and apertured to permit the supports 17 to pass therethrough, set screws 31 entering said enlargements to engage the supports whereby to securely support said members 29 in any vertically adjusted position. Said enlargements 30 are formed with curved upwardly projecting extensions 32 to support various articles. The guide 19 is provided with a wearing strip 33 which is placed against the inner surface of the dove-tailed groove to engage the dove-tail extension 23 of the slide 24 to take up wear, said strip being held in engagement with the dovetail extension by means of a set screw 34 which enters the guide 19 as indicated in Fig. 3.

The bar indicated at 35 in Fig. 2, is rested at its left hand end upon the rollers 27, said rollers serving jointly to support the bar and to permit rotation thereof without friction. It will be apparent that the slides 23 may be adjusted transversely of the lathe to variously position the left hand end of said bar.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention, what I claim as new and desire to secure by Letters Patent is:—

1. A bar rest for turret lathes including a base, a pair of uprights rising therefrom, a guide connecting their upper ends, a slide adjustable longitudinally on the guide, a pair of slotted members upstanding from the slide, and rollers journaled in the slots thereof with their peripheries spaced to support the bar.

2. A bar rest for lathes including a base plate, a pair of vertical uprights mounted thereon, a guide connecting the upper ends of said uprights, a slide movably mounted in the guide, means on the slide for antifrictionally supporting the bar, a plurality of connecting bars each having its ends enlarged and apertured to receive said uprights and provided with upwardly projecting extensions, and set screws in the enlargements, for the purpose set forth.

3. A bar rest for turret lathes including a base plate, having spaced bosses formed with apertures, uprights having their lower ends inserted in said apertures, means for securing the uprights in place, a guide having a dove-tailed groove connecting the upper ends of said uprights, a slide having a dovetailed extension to enter the groove, upwardly projecting members on the slide, and a roller mounted in each upwardly projecting member to anti-frictionally support the bar therebetween.

In testimony whereof I affix my signature in presence of two witnesses.

LEON F. GUNTHER.

Witnesses:
A. W. De Weese,
Grace E. De Weese.

Copies of this patent may be obtained for five cents each, by addressing the "Commissioner of Patents, Washington, D. C."